United States Patent Office 3,850,875
Patented Nov. 26, 1974

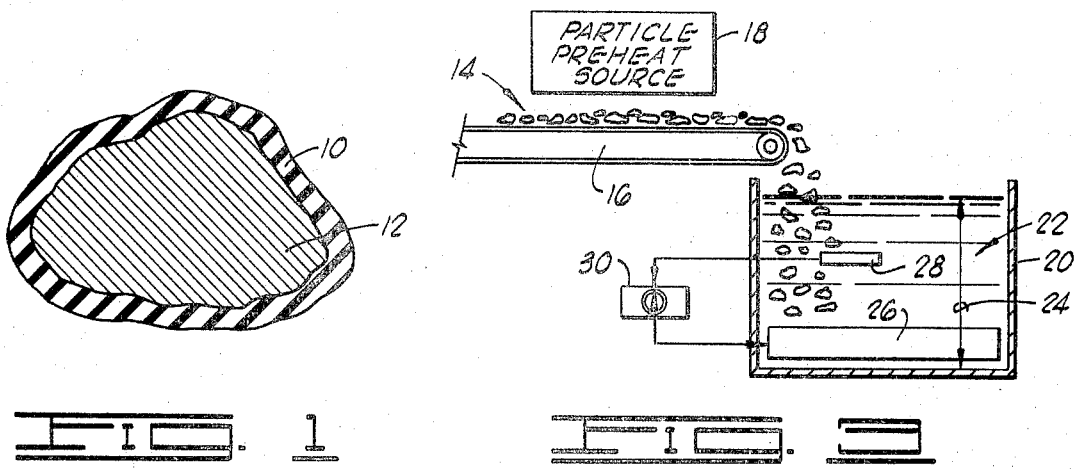
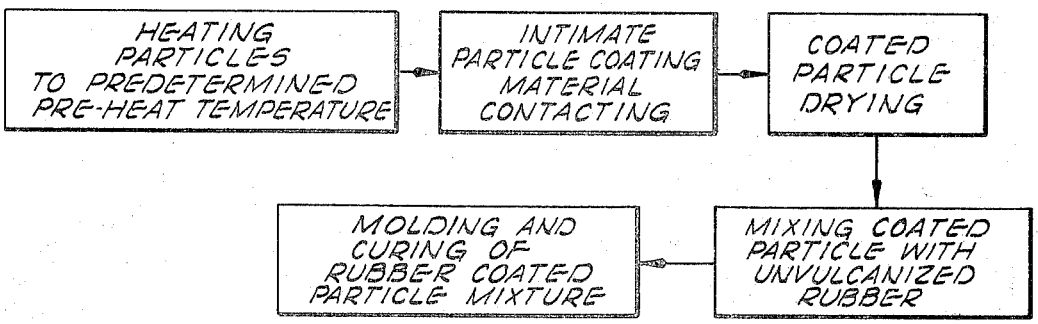
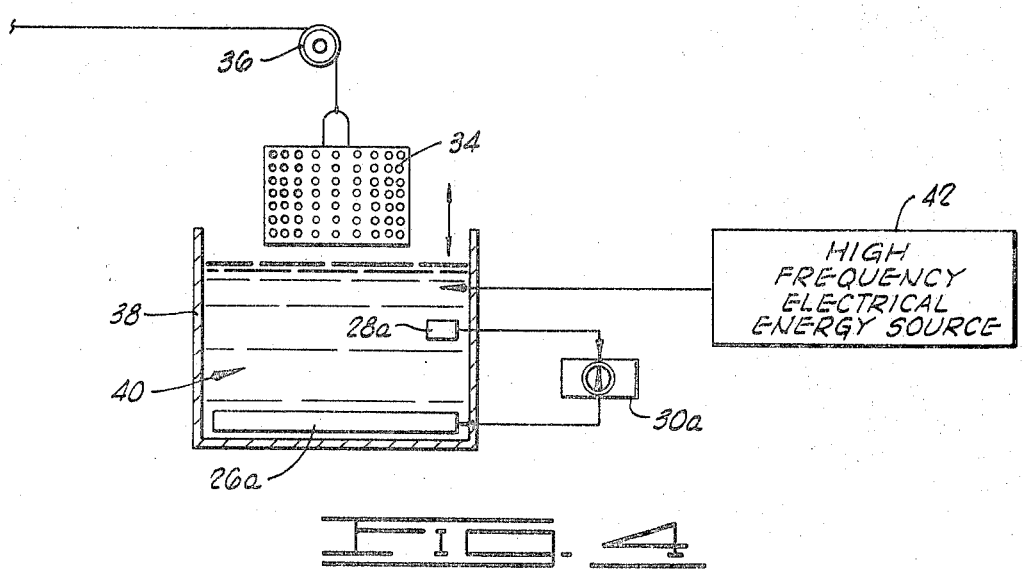

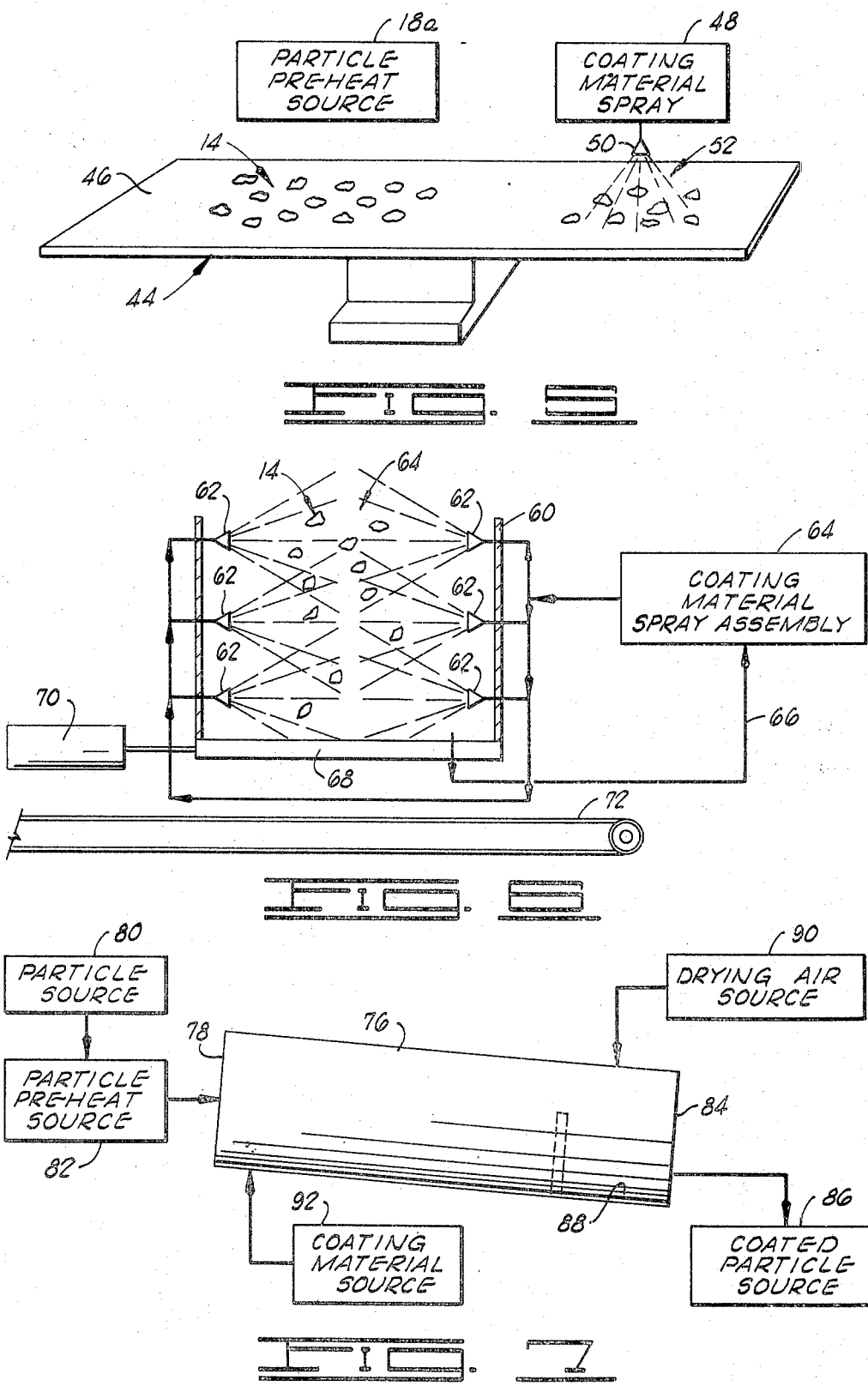

3,850,875
METHOD OF COATING PARTICLES AND MANUFACTURING OF TIRE TREAD RUBBER FORMULATIONS AND THE LIKE
Bruce H. Robson, Oklahoma City, Okla., assignor to R. M. Akers, Oklahoma City, Okla.
Filed Sept. 25, 1972, Ser. No. 291,939
Int. Cl. B29h 17/38; B60c 11/80; C08c 11/08
U.S. Cl. 260—42.14                    2 Claims

ABSTRACT OF THE DISCLOSURE

An improved method of coating particles and, in one form, an improved method of manufacturing tire tread rubber formulations, having particles of an abrasive-like material embedded therein, wherein the particles are preheated and subsequently brought into intimate contact with a coating material, the preheat temperature of the particles enhancing the bonding of the coating material to each of the particles. In one form, the coated particles are then dried and mixed with an unvulcanized tire tread rubber formulation, the unvulcanized tire tread rubber formulation being subsequently molded and cured to form the completed tire tread.

BACKGROUND TO THE INVENTION

1. Field of the Invention

This invention relates generally to improved methods of coating particles and, more particularly, but not by way of limitation, to an improved method of manufacturing a tire tread rubber formulation having particles of an abrasive material or the like embedded therein.

2. Description of the Prior Art

In the past many attempts have been made to add various types of particle-like matter to rubber formulations for manufacturing tire treads, particularly of the "anti-skid" type, for example. Some of the problems encountered have generally related to the selection of an appropriate type of particle-like material, and the process utilized in mixing the particular, particle-like material with the tire tread rubber formulation to assure an adequate bonding therebetween, for example.

The United States Patent No. 2,690,461, issued to Iknayan, disclosed an anti-skid tire tread and method of manufacturing the anti-skid tire tread wherein salt crystals were placed into a tumbling type of coating pan which was rotated while a coating composition was slowly added, heated air being forced into the tumbling pan throughout the operation to facilitate the drying of the salt crystals and the coating composition. The coating composition consisted of a mixture of a glue and rubber, and a dye was added to the coating material so that the operator could visually determine whether or not the salt crystals were sufficiently coated.

The United States Patent, No. 2,690,461, issued to Steeves, disclosed a non-skid vehicle tire wherein irresilient "hard" rubber particles were incorporated in the tire tread rubber formulation. The hard rubber particles added to the tire tread rubber formulation were either unvulcanized or partially vulcanized, the hard rubber particles being bonded in the tire tread rubber formulation during the vulcanization process of the tire tread rubber formulation. In one form, the Steeves patent disclosed the coating of the hard rubber particles with a rubber cement or similar liquid adhesive, the coated hard rubber particles being subsequently added to the tire tread rubber formulation for forming and manufacturing the completed tire tread.

The United States Patent, No. 2,672,910, issued to Corson, disclosed a non-skid tire tread rubber formulation wherein hard, vulcanized rubber having particles (such as silicon carbide) were embedded throughout. The tire tread rubber formulation was produced by adding the particles to the rubber formulation and then vulcanizing the milled stock to full hardness, the vulcanized material being then cut into small pieces, each small piece containing a number of the smaller abrasive particles. The cut pieces were subsequently mixed with the tire tread rubber formulation or material.

The United States Patent, No. 2,766,800, issued to Rockoff, disclosed a method for producing non-skid rubber materials such as tires, wherein hollow, frangible particles were included in the rubber formulation. When the hollow particles were broken during the utilization of the produced rubber formulation, the broken, hollow particles formed suction cups for gripping the contacting surface.

The United States Patent, No. 2,776,914, issued to Faulwetter, disclosed a stone particle, coated with a resin mixture wherein the stone particles were thoroughly wetted with a resin-solvent mixture, the solvent being subsequently evaporated leaving the stone particle coated with the resin mixture. The coated stone was then added to a concrete mixture. In one form, the stone was preheated to approximately the boiling point of the resin solvent solution, the resin-solvent solution being also preheated to approximately the same temperature to drive the solvent vapors off in a more rapid manner when contacted by the heated stone particles.

The United States Patent, No. 2,084,784, issued to Stahl, disclosed a method for embedding abrasive particles in a rubber formulation wherein the abrasive particles were initially coated with a metal, such as a brass, via a plating process wherein the abrasive particle was plated with the metal coating, thereby forming a permanent union with the particle and being bondable with the rubber formulation. The United States Patent, No. 2,171,438, issued to Tarbox, also disclosed a method for manufacturing vehicle tire tread rubber formulations having abrasive particles embedded therein coated with a brass or latex.

The United States Patent, No. 1,578,121, issued to Haw, disclosed a coated stone aggregate manufactured via mixing pulverized stone with a small quantity of rubber. The rubber was allowed to permeate the entire body of the stone aggregate and surround each of the stone particles forming a coating thereon, the coated stone being subsequently cooled and mixed with a rubber formulation. The United States Patent, No. 2,011,496, issued to Luchinger, disclosed a process for producing an anti-slip rubber material utilizing abrasive particles (such as quartz) coated with a viscous binding agent, the binding agent being coated on the abrasive particle via stirring the quartz in a solution of the binding agent.

SUMMARY OF THE INVENTION

An object of the invention is to provide an improved method of coating particles with a coating material in a faster, more convenient, more efficient, and more positive manner.

Another object of the invention is to provide a method of manufacturing coated particles wherein the thickness of the coating material about each particle is substantially controlled in a faster, more efficient, and more positive manner.

Yet another object of the invention is to provide an improved method of manufacturing tire tread rubber formulations having abrasive particles embedded therein in a faster, more convenient, and more efficient manner.

Another object of the invention is to provide an improved method of manufacturing a tire tread rubber formulation having abrasive particles embedded therein which are economical in construction and in operation.

Another object of the invention is to provide an improved method of coating particles which is economical in construction and in operation.

Other objects and advantages of the invention will be evident from the following detailed description when read in conjunction with the accompanying drawings which illustrate various embodiments of the invention.

BRIEF DESCRIPTION OF THE DRAWINGS

FIG. 1 is a cross-sectional, diagrammatical view of a particle coated with a coating material in accordance with the method of the present invention.

FIG. 2 is a diagrammatic view schematically illustrating one preferred embodiment of the steps of the present invention.

FIG. 3 is a diagrammatic, schematic view illustrating one preferred embodiment of some of the steps of the method of the present invention.

FIG. 4 is a diagrammatic, schematic view illustrating one other preferred embodiment of some of the steps of the present invention.

FIG. 5 is a diagrammatic, schematic view illustrating still another preferred embodiment of some of the steps of the present invention.

FIG. 6 is a diagrammatic, schematic view illustrating another preferred embodiment of some of the steps of the present invention.

FIG. 7 is a diagrammatic, schematic view illustrating yet one other preferred embodiment of some of the steps of the present invention.

DESCRIPTION OF THE PREFERRED EMBODIMENTS

In many applications, it is necessary to disperse particles of a particular composition throughout a product material, the product material having the particles embedded therein for various reasons depending upon the particular application. For example, in the production of a "non-skid" or "anti-skid" rubber formulation for vehicle tire treads, it is necessary, in some applications, to disperse and embed particles of an abrasive material throughout the tire tread rubber formulation. One of the problems encountered in the construction or production of the "anti-skid" tire tread rubber formulations has been the proper, predetermined selection of the appropriate particle abrasive material which can be bonded or secured in the tire tread rubber formulation during the vulcanization thereof or at some other step during the processing of the tire tread rubber formulation in the manufacture of tire treads, in a relatively fast, convenient and more efficient manner. In one other operational example, particles of an abrasive material are dispersed throughout a concrete-like mixture to form an "anti-slip" type of flooring or sidewalk surfacing product material or the like, for example.

In general, the method of the present invention is constructed to provide a means for coating particles with a coating material, in a fast, convenient and more efficient manner (a bonding material 10 coated about the outer periphery of a particle 12 being diagrammatically shown in FIG. 1 for the purpose of clarity of description). The particular particles are predetermined in accordance with the known subsequent utilization of the coated particles, and the coating material is predetermined to be of the type bondable to the predetermined particles, and, more particularly, in one preferred application, to be bondable to the particles via the application of a predetermined amount of heat to form a coating of the coating material, or, in other words, to bond a layer of the coating material generally about the outer surface of each of the particles to be coated, in a manner to be described in greater detail below with reference to particular examples.

Thus, the coating material is selected to be of the type which is bondable to the particle and, more particularly, of a type such that the heat generated via the preheated particle is utilized or, in other words, coacts with the coating material to effect the union or bonding of the coating material to the particles, in a preferred embodiment. In one preferred form, the coating material is also predetermined to be of a type bondable to a product material to form a product material having a plurality of the previously coated particles embedded therein, the coating material facilitating and enhancing the bonding or securing of the particles to the product material during the production or formation thereof, in a manner to be described in greater detail below with reference to specific examples for the purpose of clarity of description.

The steps of the method of the present invention are diagrammatically shown in FIG. 2, in one preferred form, the steps generally comprising: heating the predetermined particles to a predetermined preheat temperature level; moving the particles into a position wherein the particles are intimately contacted via the coating material, or, in other words, the step of "intimate particle-coating material contacting"; drying the coated particles; mixing the dried, coated particles with the product material to form the mixture of the product material and the coated particles to form the final product material or end product material which generally comprises the product material having the particles dispersed or embedded therein. In one preferred form, schematically shown in FIG. 2, the method of the present invention is utilized to facilitate the mixing and bonding of coated particles, preferably of an abrasive material, with an unvulcanized rubber to form a tire tread rubber formulation, as generally mentioned before. In this form, the coated abrasive particles are mixed with the unvulcanized rubber formulation and the rubber formulation-coated particle mixture is then molded and cured to form the product material or, more particularly, the tire tread composition comprising the rubber formulation having the coated, abrasive particles dispersed and embedded therein. In this last-mentioned application, the coating material is predetermined to be of the type bondable to the abrasive particles and of the type forming a bond with the tire tread rubber formulation during the vulcanization process thereof, as will be described in greater detail below with respect to some specific examples, for example.

Utilizing the method of the present invention, the thickness of the layer of coating material about each of the particles, the coating material per se, the particles size, the particle preheat temperature level, and the particle-coating material contact time are each variables to be determined in a particular process according to the predetermined particles to be utilized and according to the product material in which the predetermined particles are to be dispersed and embedded. The relationship, mentioned before, can be expressed algebraically as follows:

(thickness of particle coating) = (coating material) (particle size)(particle preheat temperature level) (particle coating material contact time)(viscosity of the coating material)    (1)

In a preferred form, each of the particles are preheat to a predetermined preheat temperature level, such that, when the particles are intimately contacted via the coating material, the heat generated via the preheated particles coacts with the coating material to provide a heat catalyst facilitating and enhancing the bonding of the coating material generally about the outer peripheral surface of each of the particles. Thus, the particular, predetermined particle preheat temperature level varies depending upon the size of the preselected particles, the predetermined coating material to be utilized and the predetermined thickness or predetermined average thickness of the layer of the coating material to be bonded about the particles.

Diagrammatically and schematically shown in FIG. 3 is a particular arrangement of apparatus for effecting the steps of preheating the particles and coating the preheated particles with the coating material. More particularly, the particles (designated in FIG. 3 by the general reference numeral 14) are disposed on a conventional belt type conveyor 16 or the like, the conveyor 16 moving the particles 14 into heating proximity with respect to a particle preheat source 18. The particle preheat source 18 is constructed to produce sufficient heat to preheat each of the particles 14 disposed in heating proximity therewith to a predetermined temperature level. Heat sources constructed to produce a sufficient amount of heat for preheating particles and the like in the manner described before with respect to the particle preheat source 18 are commercially available and may be electric or the type generally referred to in the art as induction coil type of heat sources, for example.

After the particles 14 have been preheated by the particle preheat source 18 to the predetermined temperature level, the particles 14 are then dropped off the end of the conveyor 16 into a tank 20 containing a predetermined volume of the preselected coating material (generally designated in FIG. 3 by the reference numeral 22). More particularly, the tank 20 is constructed to retain a predetermined column or height 24 of the coating material 22 therein. Each of the preheated particles 14 are thus immersed within the coating material 22 and intimately contacted thereby as each of the particles 14 falls through the coating material 22 generally toward the bottom of the tank 20, each particle 14 falling or moving a distance 24 through the coating material 22 while remaining in intimate contact therewith. As each particle 14 falls through the column or height 24 of the coating material 22 and is intimately contacted thereby, the heat generated via each of the preheated particles 14 acts as a catalyst or, in other words, coacts with the coating material 22 to facilitate and enhance the bonding of the coating material 22 generally about the outer peripheral surface of each of the particles 14.

Also, as each of the particles 14 falls through the height 24 of the coating material 22, the heat generated via the preheated particle 14 is expended to enhance and facilitate the bonding of the coating material 22 about each of the particles 14. Thus, each of the particles 14 is cooled as the particles 14 move through the column 24 of the coating material 22, generally toward the bottom of the tank 20. In a preferred form, the height 24 is predetermined to be of a sufficient distance such that each particle 14 is cooled or, in other words, the temperature level of each of the preheated particles 14 is lowered to a level at which the heat generated via the preheated particles 14 is no longer sufficient to coact with the coating material 22, thereby reducing the bonding of the coating material 22 to the particles 14 to substantially zero. Thus, the amount of coating material 22 bonded to each of the particles 14 is increasingly decreased as each of the particles 14 falls through the column of coating material 22 moving generally toward the bottom of the tank 20, the bonding of the coating material 22 about the particles 14 being reduced to substantially zero or virtually ceasing prior to the particles 14 coming to rest generally at the bottom of the tank 20.

Since the temperature level of the particles 14 is reduced below the predetermined minimum temperature level required to generate heat sufficient to coact with the coating material 22 to effect the bonding of the coating material 22 about the particles 14 prior to the particles 14 coming to rest generally at the bottom of the tank 20 or, in other words, while the particles 14 are still falling through the column 24 of the coating material 22, the coated particles 14 can easily be accumulated generally at the bottom of the tank 20 for subsequent removal. In this manner, the length of time during which the coated particles 14 remain in tank 20 prior to removal is not a critical factor, since further or additional coating of the particles 14, accumulated generally at the bottom of the tank 20, is reduced to substantially zero or maintained at a minimum level while other particles 14 are being simultaneously discharged from the conveyor 16 into the coating material 22 and coated thereby.

The heat exchange between the preheated particles 14 and the coating material 22 in the tank 20 will affect the temperature level of the coating material 22. Further, in some applications, the temperature level of the coating material 22 considered with the type of preselected coating material and the preheat temperature level of the particles 14 will, to some extent, affect the bonding of the coating material 22 to the particles 14 and the thickness of the layer of coating material 22 bonded about the particles 14. In most applications, the temperature level of the coating material 22 will also affect the viscosity of the coating material, the viscosity of the coating material 22 being a consideration in determining the rate of speed at which the particles 14 will fall through the column 24 of the coating material 22. The column height 24 of the coating material 22, the preheat temperature level of the particles 14, the predetermined thickness of the layer of the coating material 22 to be coated on the particles 14, the temperature level of the coating material 22, the particular preselected coating material 22 are each considered along with the rate of speed at which the particles 14 fall through the coating material 22 to assure the particles 14 are each coated with the coating material 22 and cooled below the predetermined temperature level substantially preventing further bonding of the coating material 22 about the cooled particles 14 prior to the coated particles 14 settling generally at the bottom of the tank 20.

As diagrammatically and schematically shown in FIG. 3, the coating material 22 in the tank 20 is heated via a coating heating source 26 disposed in heating proximity with respect to the coating material 22. The coating heating source 26 is connected to a temperature level sensor 28 via a temperature controller 30, the temperature controller 30 receiving the sensed temperature level of the coating material 22 via the temperature sensor 28 and controlling the amount of heat supplied via the coating heating source 26 in response thereto to maintain the coating material 22 at a predetermined temperature level. The heating of a batch of liquid and the controlling of the amount of heat supplied to the liquid via temperature sensors and temperature controllers are well-known in the art, and a detailed description of the construction and operation of the various components is not required herein.

It should also be noted that, in some applications, the coating of the particles 14 can be effectively controlled via controlling the temperature level, the viscosity and the column height 24 of the coating material 22, thereby eliminating the step of preheating the particles 14. However, the step of preheating the particles 14 also drives a substantial portion of the air from the capillaries of the particles 14 and further enhances the bonding between the coating material 22 and the particles 14, the step of preheating the particles 14 being included in the process, in a preferred form.

Diagrammatically and schematically shown in FIG. 4 is another apparatus for effecting the steps of preheating the particles to a predetermined preheat temperature and bringing the particles and the coating material into intimate contact to coat each particle with a layer of predetermined thickness of the coating material, in a manner similar to that described before. The particles are initially loaded into a conventional, perforated type of strainer basket 34 and lowered via a cable-pulley assembly 36 or the like into a tank 38 containing a predetermined amount of coating material 40. The coating material 40 in the tank 38 is heated to a predetermined temperature level to maintain the desired, predetermined plasticity or, more particularly, viscosity of the coating material 40 via a coating material heating source 26a controlled via a temperature sensor 28a and a temperature controller 30a, the coating material heating source 26a, the temperature controller 30a and the temperature sensor 28a each operating to maintain the predetermined temperature level of the coating material 40 in a manner similar to that described before with respect to the coating heating source 26, the temperature controller 30 and the temperature sensor 28, shown in FIG. 3.

After the particles have been lowered into the tank 38 bringing the particles into intimate contact with the coating material 40, high frequency electrical energy is applied within the tank 38 via a conventional high frequency electrical energy source 42, the power level and frequency of the electrical energy generated via the high frequency electrical energy source 42 being determined such that the energy emitted thereby will heat the particles in the strainer basket 34 to a predetermined temperature level. More particularly, the high frequency electrical energy source 42 is constructed and connected to the coating material 40 to elevate the temperature level of the particles to the predetermined particle preheat temperature level so the heat generated via the preheated particles facilitates and enhances the bonding of the coating material about the outer periphery of each of the particles in the strainer basket 34 in a manner similar to that described before with respect to the apparatus of FIG. 3.

Diagrammatically and schematically shown in FIG. 5 is still another apparatus constructed to preheat the particles 14 to the predetermined preheat temperature level and move the preheated particles 14 into a position for intimate contacting with the coating material to coat each of the preheated particles 14 with a layer of coating material. More particularly, the apparatus shown in FIG. 5 generally comprises a shaker table 44 having an inclined upper surface 46 receiving the particles 14 to be coated, the shaker table 44 being constructed to vibrate the particles 14 disposed on the upper surface 46 thereof. Shaker tables constructed to receive particles and vibrate in a manner similar to that described with respect to the shaker table 44 are well-known in the art and a detailed description of the construction and operation thereof is not required herein.

After the particles 14 are disposed on the shaker table 44, the particles 14 are moved into heating proximity with respect to a particle preheat source 18a, constructed in a manner similar to the particle preheat source 18, shown in FIG. 3, to heat each of the particles 14 in the heating proximity therewith to the predetermined preheat temperature level. The preheated particles 14 are then moved into position for intimate contacting via the coating material.

The intimate particle-coating material contacting step of the present method is effected via a coating material spray 48 which is constructed to storingly retain a predetermined volume of the coating material and to spray the coating material generally over a predetermined portion of the surface 46 of the shaker table 44, the coating material being sprayed on the surface 46 of the shaker table 44 via a spray nozzle 50 (the spray of coating material from the coating material spray 44 and the nozzle 50 being diagrammatically shown in FIG. 5 and designated therein generally by the reference numeral 52). The shaker table 44 will continually vibrate imparting motion to the particles 14 disposed on the upper surface 46 of the shaker table 44 thereby facilitating intimate contact between the sprayed coating material 62 and each of the particles 14 over substantially the entire surface of each of the particles 14 to be coated during the operation of the apparatus as shown in FIG. 5.

It should be noted that the coating material spray 48, in a preferred from, also includes a coating material heating source (not shown) for maintaining the temperature level of the coating material at a predetermined level to assure the desired viscosity of the coating material, for reasons and in a manner similar to that described before with respect to the coating material heating source, the temperature sensor and the temperature controller, as shown in FIGS. 3 and 4. In a preferred form, the shaker table 44 also includes apparatus for collecting the excess sprayed coating material and recirculating the excess coating material through the coating material spray 48. Spray assemblies constructed to store a predetermined amount of material and to spray the stored material in a predetermined spray-pattern, including facilities to collect and recirculate the material sprayed and heating sources for maintaining the material at predetermined temperature levels in a manner similar to that described before with respect to the coating material spray 48 and the nozzle 52 are well-known in the art and a detailed description of the various components and operations thereof is not required herein.

Diagrammatically and schematically shown in FIG. 6 is yet another assembly for effecting the steps of bringing the particles 14 into intimate contact with the coating material for coating each of the particles with a predetermined layer of the coating material, the apparatus shown in FIG. 6 including a tank 60 having a plurality of spray nozzles 62 disposed and supported therein. More particularly, the spray nozzles 62 are disposed and supported within the tank 60 and each of the spray nozzles 62 is constructed to spray the coating material therefrom in a predetermined spray pattern (the sprayed coating material being diagrammatically shown in FIG. 6 and designated therein via the general reference numeral 64). The disposition and arrangement of the spray nozzles 62 and the predetermined, designed spray pattern effected by each of the spray nozzles 62 is constructed such that each of the particles 14 falls through the tank 60 generally between the spray nozzles 62.

Each of the spray nozzles 62 is connected to a coating material spray assembly 64, the coating material spray assembly 64 being constructed to storingly retain a predetermined volume of coating material and to supply the coating material at a predetermined pressure level at the spray nozzles 62, in a manner similar to that described before with respect to the coating material spray 48 and spray nozzle 50 shown in FIG. 5. The coating material spray 64 also includes a heating assembly (not shown) for heating and maintaining the coating material at a predetermined temperature level to maintain a predetermined viscosity of the coating material, for reasons and in a manner described before with respect to the apparatus shown in FIGS. 3, 4 and 5. As diagrammatically shown in FIG. 6, the excess coating material is recirculated through the coating material spray assembly 64 via a conduit 66 in communication with the lower, bottom portion of the tank 60.

In one form, as diagrammatically shown in FIG. 6, the bottom of the tank 60 includes a door 68 mechanically connected to an actuator 70, the door 68 and actuator 70 each being constructed such that the door 68 can be positioned in an opened and a closed position via the actuator 70. In the opened position of the door 68, the coated particles collected at the bottom of the tank 60 are released and dropped onto a conveyor 72, the conveyor 72 moving the coated particles to a remote position for subsequent processing in accordance with the steps of the method of the present invention.

In utilizing the apparatus shown in FIG. 6, the particles 14 are preheated to a predetermined preheat temperature level prior to being discharged between the spray nozzles 62 of the tank 60, in a manner similar to that described before with respect to the apparatus of FIGS. 3, 4 and 5, for example. The preheated particles are then discharged into the tank 60 between the spray nozzles 62 and the sprayed coating material 64 intimately contacting the preheated particles coating the preheated particles in a manner and for reasons similar to that described before.

Diagrammatically and schematically shown in FIG. 7 is yet another apparatus for effecting the steps of preheating the particles, coating the preheated particles with a predetermined layer of coating material, and drying the coated particles, the apparatus including a tumbling barrel 76 having a particle inlet end 78 adapted for receiving the preheated particles. More particularly, the particles are discharged into the inner chamber (not shown) of the tumbling barrel 76 from a particle source 80, the particles being moved from the particle source into the inner chamber of the tumbling barrel 76 via a particle preheat source 82. The particle preheat source 82 is constructed similar to the particle preheat sources described before for heating each of the particles to a predetermined preheat temperature level prior to the discharging of the preheated particles into the inner chamber of the tumbling barrel 76.

The tumbling barrel 76 is constructed to be rotated and to generally move the particles from the particle inlet end 78 toward the particle outlet end 84 thereof, the coated particles being discharged from the particle outlet end 84 via a coated particle discharge 86. A drying chamber 88 is formed in the tumbling barrel 76, generally near the particle outlet end 84, and a drying air source 90 is connected to the drying chamber 88. The drying air source 90 is constructed to provide air heated at a predetermined temperature level generally within the drying chamber 88 to effect the drying of the coated particles prior to the discharge of the dried, coated particles from the tumbling barrel 76. A coating material source 92 is connected to the inner chamber of the tumbling barrel 76 and constructed to provide coating material therein and, in a preferred form, to provide the coating material at a predetermined temperature level, during the operation of the apparatus shown in FIG. 7.

The tumbling barrel 76 will thus be continuously rotated and will continuously receive the preheated particles from the particle source 80 via the particle preheat source 82. The particles discharged into the inner chamber of the tumbling barrel 76 are intimately contacted via the coating material discharged therein from the coating material source 92, the rotation of the tumbling barrel 76 effecting the intimate contacting between the particles and the coating material to substantially assure a uniform coating of the coating material over the entire surface of each of the particles discharged into the tumbling barrel 76. The tumbling barrel 76 is also constructed to continuously move each of the particles in a direction generally from the particle inlet end 78 toward the particle outlet end 84, the particles being intimately contacted and coated via the coating material as the particles continuously move toward the particle outlet end 84.

Prior to being discharged, the coated particles are moved into and through the drying chamber 88 of the tumbling barrel 76, the particles in the drying chamber 88 being contacted via the heated air from the drying air source 90 and dried thereby. The dried coated particles are then discharged from the particle outlet end 84 via the coated particle discharge 86 to be subsequently processed in accordance with the steps of the present invention, described before.

As mentioned before, the method of the present invention is particularly useful for coating particles of an abrasive material and subsequently mixing the coated particles with a substantially unvulcanized rubber formulation, the mixed coated particle-rubber formulation being subsequently molded and cured to form a tire tread rubber formulation for vehicle tires, in one particular application. It should be noted that the term "tire tread rubber formulation" or simply "rubber formulation" is used herein to denote any suitable material or synthetic rubber formulation previously utilized in the manufacture of tire treads, including the well-known types of rubber formulations employed in recapping rubber. In the past it has been usual for such rubber formulations to include any of several desired rubber polymers, such as styrene-butadine and polybutadine; a carbon black filler; an aromatic oil; an antioxidant wax and curing chemicals, for example. Various rubber formulations suitable for utilization in the manufacture of tire treads for new tires as well as for recapping and the like are described in "Engineering With Rubber" edited by Walter E. Burton, published by McGraw-Hill Book Company, Inc., First Edition, 1949, for example, such rubber formulations (synthetic and natural) are well-known in the art and a detailed description is not required herein.

In one particular application of the method of the present invention for the manufacture of tire tread rubber formulations having particles of an abrasive-like material embedded therein, one type of abrasive particle which has been found to be particularly suitable consists essentially of an aluminum oxide abrasive aggregate or the like, for example. More particularly, the particles of abrasive material are of the type consisting essentially of two aggregates; the first aggregate consisting essentially of particles having a mesh size in the range of approximately 14 to approximately 20 with each particle consisting of 55% to 60% aluminum oxide and approximately 40% to 45% magnetite. Such a product has, in the past, been used as a non-slip floor hardener for concrete floors and may be obtained under the trade name Frictex 176 from Sonneborn Building Products, Inc. of Des Plaines, Ill. In one other form, the abrasive particles may consist essentially of an aluminum oxide abrasive aggregate having a mesh size in the range of approximately 4 to 6, this last-mentioned abrasive particle having been used in the past as a non-slip abrasive aggregate for concrete floors and commercially available under the trade name of Frictex from Sonneborn Building Products, Inc. of Des Plaines, Ill.

The coating material is, more particularly, of a type bondable to the particles of abrasive material, described before, and chemically bondable to the tire tread rubber formulation during the vulcanization thereof, thereby forming the final product material of the tire tread rubber formulation having the particles of abrasive material embedded therein. The coating material thus enhances and facilitates the securing of the particles of abrasive material in the tire tread rubber formulation.

In one particular application of the method of the present invention for the manufacture of tire tread rubber formulations suitable for use in cooperation with the apparatus shown in FIGS. 3 and 4 (described before), for example, the particles of an abrasive-like material (specifically mentioned before) are initially preheated to a preheat temperature level of approximately 1800 degrees Fahrenheit and subsequently dropped into a solution of coating material, the coating material being preferably a non-flammable solution of an elastomer type of bonding agent such as the bonding agent "Chemlok 231" manufactured by Hughson Chemical Co., Division of Lord Corp. of Erie, Pa., for example. "Chemlok" is the trademark for a series of adhesives which comprises a mixture of polymers, organic compounds and mineral fillers in an organic solvent. In this particular application, the coated particles of the abrasive material are removed from the coating material via strainer baskets or a continuous conveyor belt, for example, and dried for approximately 30 (thirty) to 40 (forty) minutes at a room temperature level, the coating material being substantially tack free with the inner film bonded and the outer film conditioned for subsequent bonding to the tire tread rubber formulation of a natural rubber, SBR, neoprene, nitrile, one of the types of polyacrylates, millable urethanes or the like, for example, during the vulcanization thereof.

It should be noted that, in those applications utilizing the bonding agent or coating material of the type sold under the trade name "Chemlock 231," mentioned above, it has been found desirable to dilute the coating material to achieve a predetermined coating material viscosity or film weight. Also a coating material thickness generally between 1.0 and 2.0 milli-inches on the particles of abrasive material has been found to produce satisfactory results, for example.

The coated particles of abrasive material are mixed with the vulcanized tire tread rubber formulations, and the bonding between the coating material and the unvulcanized tire tread rubber formulations is effected simultaneously with the molding and curing of the tire tread rubber formulations at temperature levels of approximately 275 degrees Fahrenheit for approximately 30 minutes or at a temperature level of approximately 300 degrees Fahrenheit for approximately 10 minutes, for example. With reference to the variables noted in the expression (1) above, it should be noted that "Chemlok 231" (mentioned above) will effectively bond steel to natural rubber in approximately 5 minutes at a temperature level of approximately 307 degrees Fahrenheit, and have a peel adhesion of approximately 46 pounds per inch and approximately a 100% elastomer retention, for example.

Utilizing the particles of abrasive material specifically mentioned before and a coating material consisting essentially of "Chemlok 231" (mentioned above) or the like, the size of the particles and the preheat temperature levels can be varied in accordance with the consideration mentioned before with respect to the expression (1) and the coating material temperature level can be varied substantially between room temperature and 200 degrees Fahrenheit, the "Chemlok 231" (mentioned before) bonding when the temperature level thereof exceeds approximately 200 degrees Fahrenheit. As mentioned before, the time duration of intimate particle-coating material contacting is not a factor so long as the time duration is of a sufficient length to assure the bonding of a predetermined layer of coating material to the particles of the abrasive-like material, the minimum time duration of intimate particle-coating material contacting time being approximately two (2) seconds utilizing the "Chemlok 231" in the particular application referred to above.

In one other specific application of the method of the present invention for the manufacture of tire tread rubber formulations also suitable for use in cooperation with the apparatus shown in FIGS. 3 and 4 (described before), for example, the particles of abrasive-like material are preheated to a temperature level of approximately 300 degrees Fahrenheit and brought into intimate contact with a coating material of the type sold under the trademark "Desmodur," a trademark for a group of isocyanates and isocyanate prepolymers for coating, manufactured by Farbenfabriken Bayer AG, U.S. Representative: Naftone, Div. of Mobay Chemical Company of Martinsville, W. Va., preferably diluted with hydrous and nonalcoholic ethyl acetate. The coated particles are then cooled for approximately 30 minutes at substantially room temperature levels, for example, and subsequently mixed and cured with a tire tread rubber formulation. In general, the types of tire tread rubber formulations found suitable for subsequent mixing and curing with the particles of abrasive-like material coated with a coating material of the type sold under the trademark "Desmodur," mentioned specifically before, can be summarized as follows, for example, it being understood that other tire tread rubber formulations are also considered suitable in the method of the present invention.

Natural Rubber
SBR, OER—use of intermediate layers and solutions of natural rubber or Perbunan C compounds being desirable in this application
Perbunan N (Nitrile rubber)
Perbunan C (Chloroprene rubber)
Levapren—a trademark for ethylene-vinyl acetate copolymer containing approximately 45% vinyl acetate made by Farbenfabriken Bayer AG, the U.S. Representative: Naftone, Div. of Mobay Chemical Company of Martinsville, W. Va.
Butyl Rubber—use of an intermediate sheet or coating of solution based on same compound as "Desmodur R"; but, containing additional portions of carbon black being desirable in this application With reference to the above-listed tire tread rubber formulations, it should be noted that the tire tread rubber formulation is preferably well plasticated and that the dispersion of the coated particles is controlled to effect the desired, predetermined adhesion in the final product material. Further, a high proportion of plasticizer should be generally avoided when utilizing tire tread rubber formulations of the Perbunan N and Perbunan C type.

It is also considered advisable, in most applications, to apply an intermediate layer of natural rubber or Perbunan C compound when utilizing tire tread rubber formulation of the SBR and OER types. The intermediate layer can be applied to the particles via brushing when utilizing a natural rubber in petrol or via spray gun or the like, the thickness of the intermediate layer being approximately 0.5 mils to 1.0 mil. Further, if a solution of natural rubber compound is utilized, the coated particles are preferably dried at approximately room temperature levels for approximately 2 hours, elevated temperature levels not being recommended in this particular application. In a preferred form, the uncured tire tread rubber formulation should be preformed as much as possible to reduce the flow of the "Desmodur" (mentioned specifically before), thereby preventing excessive shifting of the film of "Desmodur" (mentioned specifically before) which might result in flash adhering to and contaminating the walls of the mold and impairing the adhesion of the edges of the bonds.

In yet another particular application of the method of the present invention for the manufacture of tire tread rubber formulations suitable for use in cooperation with the apparatus shown in FIGS. 5 and 6 (described before), for example, the particles of an abrasive-like material (specifically mentioned before) are initially preheated to a preheat temperature level of approximately 300 degrees Fahrenheit and subsequently sprayed with a coating material of the type sold under the trademark "Chemlok 218" manufactured by Hughson Chemical Co., Division of Lord Corp. of Erie, Pa., for example, the coating material being diluted with chemically suitable diluents to facilitate the spraying of the coating material. The trademark "Chemlok" has been identified above. In most applications, the addition of 10 percent by volume of cyclohexanone or Solvesso or the like will minimize detrimental effects generally referred to in the art as "feathering" or "cobwebbing."

In the last-mentioned application, the thickness of the layer of the coating material on the particles of abrasive-like material is preferably in the range of approximately 0.5 milli-inches to 1.0 milli-inches, and the coated particles are preferably dried at approximately a room temperature level or at an elevated temperature level of approximately 250 degrees Fahrenheit for approximately 15 minutes, for example. The dried, coated particles are then mixed with the tire tread rubber formulation in the mixing mill or the like and press-cured at a temperature level of approximately 300 degrees Fahrenheit for approximately 30 minutes or at a temperature level of approximately 212 degrees Fahrenheit for approximately 100 hours, for example.

In still another particular application of the method of the present invention for the manufacture of tire tread rubber formulations suitable for use in cooperation with the apparatus shown in FIG. 7 (described before), for example, the particles of an abrasive-like material specifically mentioned before) are preheated to a preheat temperature level of approximately 300 degrees Fahrenheit and discharged into the tumbling barrel 76. A coating material of the halogenated elastomeric derivative type such as "braze," for example, is discharged into the tumbling barrel 76 and brought into intimate contact with the preheated particles, in a manner and for reasons described before. The coated particles are dried for approximately 30 minutes and then mixed with a suitable tire tread rubber formulation such as SBR, neoprene or butyl, for example, in the mixing mill, the mixed tire tread rubber formulation being subsequently press-cured at a temperature below 350 degrees Fahrenheit, for example.

In yet another specific application utilizing the principles of the method of the present invention, the particles of abrasive-like material (specifically referred to before) are preheated to a preheat temperature level exceeding the vulcanizing temperature level of the tire tread rubber formulation, approximately 300 degrees Fahrenheit, for example, to dry the particles and to drive out a substantial portion of the air from the capillaries in the particles. The preheated particles are then brought into intimate contact with the unvulcanized tire tread rubber formulations, the heat generated via each of the preheated particles vulcanizing the tire tread rubber formulation intimate contact therewith forming a coating or layer of vulcanized tire tread rubber formulation about the outer peripheral surface of each of the particles, the coating material constituting the tire tread rubber formulation in this particular application.

In this last-mentioned application above, the heat generated via the preheated particles of the abrasive-like material not only vulcanizes the tire tread rubber formulation in intimate contact therewith; but, also has the effect of immediately heating the unvulcanized tire tread rubber formulation so it will flow relatively freely into the particles of the abrasive-like material. When the particles are subsequently cooled, a vacuum exists generally within the capillaries of the particles not filled with the tire tread rubber formulation and, when the coated particles and the remaining portion of the unvulcanized tire tread rubber formulation are vulcanized and cooled, the particle capillaries will remain under a vacuum acting somewhat in the nature of microscopic suction cups further facilitating and enhancing the bonding between the particles and the tire tread rubber formulation of the final product material.

In one preferred embodiment of the last-mentioned application, the tire tread rubber formulation is mixed with a thermoplastic phenolic resin, such as the type sold under the tradename "Durez 13349" manufactured by Hooker Chemical Corp. of North Tonawanda, N.Y., for example, this particular compound requiring the addition of 8 percent by volume of hexamethylenetetramine and being compounded preferably at the last stages of the Banbury mixing or on the warm-up mixing mill. The preheated particles of the abrasive-like material (specifically mentioned before) are preferably added immediately prior to removal of the tire tread rubber formulation from the mixing mill.

Referring to the last-mentioned application, a phenolic resin such as the type sold under the tradename "Durez 13355" manufactured by Hooker Chemical Corp. of North Tonawanda, N.Y., for example, is also added to the tire tread rubber formulation, in one preferred embodiment which may be useful in some applications, the additional phenolic resin acting as a reinforcing agent for tire tread rubber formulations of the type referred to generally as SBR. For example, the effect of the added "Durez 13355" (specifically mentioned above) in a standard HAF black loaded SBR tire tread rubber formulation is generally noted in the following tables:

| Compound | 1 | 2 | 3 | 4 |
|---|---|---|---|---|
| SBR 1,500 | 100 | 100 | 100 | 100 |
| HAF black | 50 | 50 | 50 | 50 |
| Stearic acid | 1.5 | 1.5 | 1.5 | 1.5 |
| Zinc oxide | 5 | 5 | 5 | 5 |
| Altax [1] | 1.75 | 1.75 | 1.75 | 1.75 |
| Sulfur | 2 | 2 | 2 | 2 |
| Durez 13355 | | | | |
| Stocks cured 20 minutes, 302° F.: | | | | |
| Tensile strength, p.s.i | 3,135 | 3,225 | 2,900 | 2,465 |
| Modulus, p.s.i., at 200% E | 817 | 1,316 | 1,426 | 1,566 |
| Elongation, percent | 515 | 395 | 355 | 305 |
| Tear resistance, lb./inch | 252 | 245 | 240 | 230 |
| Shore hardness, "A" | 67 | 70 | 76 | 82 |
| Compression set, percent (Method B) | 8.8 | 7.2 | 6.8 | 6.9 |
| Percent swell (ASTM Oil #2) | 14.6 | 11.8 | 11.2 | 10.2 |

[1] Trademark for benzothiazyl disulfide manufactured by Goodyear Tire and Rubber Company, Akron, Ohio.

From the foregoing examples, other variations and applications of the method of the present invention will be readily apparent to those skilled in the art considering the detailed description of the method of the present invention herein and the diagrammatic and schematic illustrations of some of the apparatus which may be utilized in effecting some of the various steps of the method of the present invention. It should also be noted that changes may be made in the construction and the arrangements of the various parts or the elements and in the steps of the various embodiments as disclosed herein without departing from the spirit and the scope of the invention as defined in the following claims.

What is claimed is:

1. A method for manufacturing vehicle tire treads having particles of abrasive material embedded in the tire tread rubber formulation thereof, comprising:

preheating the particles to a predetermined preheat temperature level sufficient for the particles to coact with a coating material;

intimately contacting the preheated particles with the coating material bondable to the tire tread rubber formulation, the heat generated with the intimately contacting coating material and a portion of the coating material being bonded generally about the outer peripheral surface of the particles;

drying the coated particles;

mixing the dried coated particles with the unvulcanized tire tread rubber formulation; and molding and curing the coated particle-tire tread rubber formulation mixture to form the tire tread.

2. A method of manufacturing vehicle tire treads having particles of an abrasive material embedded in the tire tread rubber formulation thereof, comprising:

preheating the particles to a predetermined temperature level exceeding the vulcanizing temperature level of the tire tread rubber formulation;

mixing the preheated particles with the unvulcanized tire tread rubber formulation, the heat generated via the preheated particles vulcanizing the tire tread rubber formulation in intimate contact therewith causing a portion of the vulcanized tire tread rubber formulation to be coated generally about the outer peripheral surface of the particles; and molding and curing the coated particle-tire tread rubber formulation mixture to form the tire tread.

References Cited

UNITED STATES PATENTS 3,694,243   9/1972   Campbell _____ 117—100 B

OTHER REFERENCES

Encyclopedia of Chem. Techn., Kirk and Othmer, 2nd ed., vol. 1, Interscience, New York, 1963, pp. 376–379, 381–383. TP9.E68.

MORRIS LIEBMAN, Primary Examiner

H. H. FLETCHER, Assistant Examiner

U.S. Cl. X.R.

117—47 H, 77, 100 B; 152—211; 156—114, 245; 260—37 N, 42.16, 42.32, 42.36, 42.37, 762, 998.13; 264—133, Dig. 65

PO-1050
(5/69)

UNITED STATES PATENT OFFICE
CERTIFICATE OF CORRECTION

Patent No. 3,850,875            Dated November 26, 1974

Inventor(s) Bruce H. Robson

It is certified that error appears in the above-identified patent and that said Letters Patent are hereby corrected as shown below:

Column 1, line 46, "2,690,461" should be --2,582,701--.

Column 7, line 60, "62" should be --52--.

Column 11, line 46, "Mobay" should be --Mobey--.

Column 11, line 70, "Mobay" should be --Mobey--.

Column 14, line 26, after the word "generated" should read --via the preheated particles coacting--.

Signed and sealed this 21st day of January 1975.

(SEAL)
Attest:

McCOY M. GIBSON JR.
Attesting Officer

C. MARSHALL DANN
Commissioner of Patents